L. J. McCORMICK & W. R. BAKER.
Harvester-Reel.
No. 200,796. Patented Feb. 26, 1878.
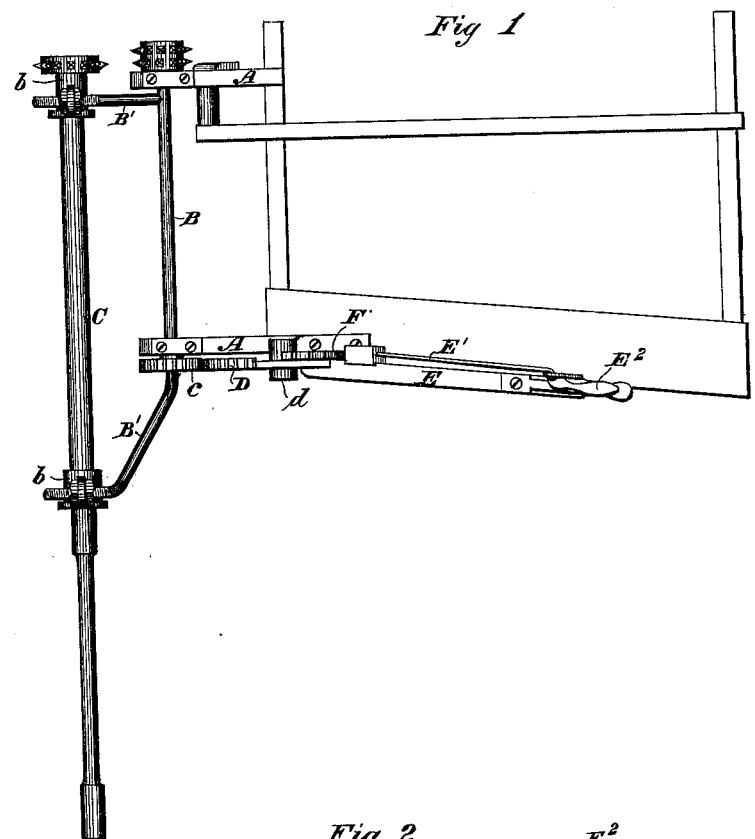
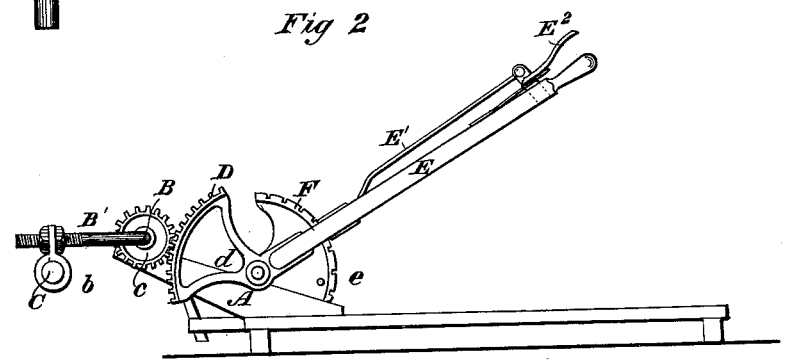
WITNESSES
INVENTORS.
Leander J. McCormick
William R. Baker
By their Attorney

UNITED STATES PATENT OFFICE.

LEANDER J. McCORMICK AND WILLIAM R. BAKER, OF CHICAGO, ILLINOIS, ASSIGNORS TO C. H. & L. J. McCORMICK, OF SAME PLACE.

IMPROVEMENT IN HARVESTER-REELS.

Specification forming part of Letters Patent No. 200,796, dated February 26, 1878; application filed June 23, 1876.

*To all whom it may concern:*

Be it known that we, LEANDER J. McCORMICK and WILLIAM R. BAKER, both of Chicago, in the county of Cook and State of Illinois, have invented certain new and useful Improvements in Harvester-Reels, of which the following is a specification:

The object of our invention is to give to a harvester-reel a wide range of adjustment, to adapt it to the varying conditions under which it is required to work.

The subject-matter claimed will hereinafter specifically be set forth.

In the accompanying drawings our improvements are shown as organized for operation in connection with the well-known McCormick hand-binding harvester.

Figure 2 represents a side elevation of so much of a harvester with our improvements applied thereto as is necessary to illustrate the subject-matter herein claimed, and Fig. 1 a plan or top view thereof.

In suitable standards A, constituting a portion of the main frame of a harvester, is mounted a rock-shaft, B, provided with crank-arms B' B', carrying the bearings $b$ $b$ of an overhung reel. In these bearings, which are adjustable endwise upon the crank-arms, the reel-shaft C turns freely, and may be driven by sprocket-wheels, over which a chain passes, or in any other well-known way.

The rock-shaft B is turned in its bearings to raise, lower, or throw the reel forward or back of the line of its support by a spur-wheel, $c$, firmly fixed upon the rock-shaft, which is engaged by a sector-rack, D, rocking on a pivot, $d$, operated by a suitable hand-lever, E, held in any desired position by a spring-detent, $E^1$, of well-known construction, taking into a notched sector-plate, F, suitably mounted on the frame, from which the detent is released by the usual elbow-lever $E^2$.

The sector-plate is, preferably, provided with a lug or pin, $e$, to limit the too far downward movement of the hand-lever, and so constructed that a lug projecting therefrom forms the pivot upon which the hand-lever rocks.

By this mode of construction it is obvious that a wide range of adjustment in the arc of a circle is imparted to the reel, and that the circle described thereby may be increased or diminished, as circumstances may require, by the proper adjustment of the reel-shaft bearings endwise upon the crank-arms; and as the reel can be held in any desired position intermediate between the limits of its movement, its value is obvious.

We claim as of our own invention and desire to secure by Letters Patent—

The combination, substantially as hereinbefore set forth, of the frame, the rock-shaft mounted thereon and supporting the reel, gearing mounted on the rock-shaft, the sector-rack controlled by a hand-lever, and the notched plate and detent, whereby the reel may be adjusted and held in its adjusted position.

In testimony whereof we have hereunto subscribed our names.

L. J. McCORMICK.
WM. R. BAKER.

Witnesses:
JOHN V. A. HASBROOK,
R. NEWTON.